United States Patent Office 3,475,467
Patented Oct. 28, 1969

---

3,475,467
PROCESS FOR PREPARING ETHERS OF 1α-HYDROXY-3-KETO-5α-STEROIDS AND INTERMEDIATES THEREIN
Rinaldo Gardi, Carate Brianza, and Pier Paolo Castelli, Monza, Italy, assignors, by mesne assignments, to Warner-Lambert Pharmaceutical Company, Morris Plains, N.J., a corporation of Delaware
No Drawing. Filed May 22, 1967, Ser. No. 640,418
Claims priority, application Germany, Nov. 18, 1966, V 32,382
Int. Cl. C07c 167/30, 169/34, 169/20
U.S. Cl. 260—397.45         17 Claims

ABSTRACT OF THE DISCLOSURE

Ethers of 1α-hydroxy-3-keto-5α-steroids are prepared by treating a corresponding Δ¹-3-keto-5α-steroid with an alkyl orthoformate and an alcohol. The process occurs through new tri-ethers of 1α,3,3-trihydroxy-5α-steroids which are also useful as intermediates for the preparation of enol ethers of Δ¹-3-keto-5α-steroids.

BACKGROUND OF THE INVENTION

This invention relates to a process for the preparation of ethers of 1α-hydroxy-3-keto-5α-steroids and to new tri-ethers of 1α,3,3-trihydroxy-5α-steroids useful as intermediates in said process.

It is known (German Patent 1,222,496) that 1α-alkoxy-3-keto-5α-androstanes may be prepared from Δ¹-3-keto-5α-androstenes by direct addition of an alkanol to the double bond in 1-position, under particular reaction conditions. According to the aforesaid patent, the addition of alcohol occurs at very low temperatures around −40 to −20° C., whereby long reaction times up to 96 hours are required to cause formation of the 1α-alkoxy derivative. Moreover, since the reaction must be effected in the presence of a large amount of alcohol (about 30–50 times higher than the starting steroid), a simultaneous alcoholysis of esters groups contained in the steroid molecule is frequently observed. Furthermore the reaction is hardly appliable to alcohols other than methanol owing to the poor reactivity of such alcohols.

Therefore the method of the prior art does not permit to obtain 1α-alkoxy-steroids in good yield with relatively short reaction times and without concomitant side reactions.

SUMMARY OF THE INVENTION

It has now been found that by subjecting a Δ¹-3-keto-5α-steroid to the concurrent action of an orthoformate and of an alcohol at moderate temperature and in the presence of an acid catalyst, a tri-ether of a 1α,3,3-trihydroxy-5α-steroid is rapidly formed, which can be quantitatively converted under mild acidic hydrolytic conditions to the corresponding ether of a 1α-hydroxy-3-keto-5α-steroid. The present invention thus provides in one of its aspects a general process for the preparation of ethers of 1α-hydroxy-3-keto-5α-steroids which needs a very short reaction time and avoids the lowe temperatures required by the above German patent.

Furthermore the invention provides, in another of its aspects, a series of new tri-ethers of 1α,3,3-trihydroxy-5α-steroids, particularly of the androstane and pregnane series which, besides being valuable intermediates in the process of this invention, are also useful as intermediates in the preparation of the enol ethers of the Δ¹-3-keto-5α-steroids.

DETAILED DESCRIPTION OF THE INVENTION

The process of this invention and the intermediates therein are represented by the following reaction sequence

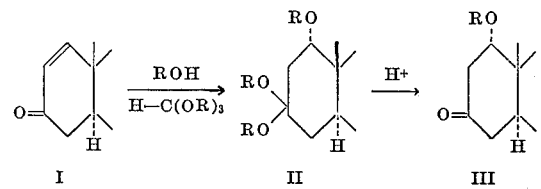

in which R is a lower hydrocarbon radical. The term "lower hydrocarbon radical" is intended to mean a lower, saturated or unsaturated, aliphatic radical containing from 1 to 6 carbon atoms such as methyl, ethyl, propyl, allyl, propargyl, butyl, pentyl and their branched isomers, or a lower cycloaliphatic radical, particularly cyclopentyl. Preferred lower hydrocarbon radicals are methyl, ethyl, propyl, alyl and propargyl; the methyl radical being particularly preferred.

The process of this invention comprises the step of reacting a Δ¹-3-keto-5α-steroid having at the ring A the structure I with an alcohol of formula ROH and an orthoformate of formula H—C(OR)₃, in which R has the above stated meaning under anhydrous conditions at a temperature below 60° C. in the presence of an acid catalyst.

The reaction may be carried out in an ether or hydrocarbon solvent, such as diethyl ether, tetrahydrofurane, dioxane, benzene, hexane, isooctane and like as well as in halogenated hydrocarbons such as methylene chloride, chloroform or carbon tetrachloride.

Suitable acid catalysts are the aromatic sulfonic acids such as toluene, benzene and naphthalene sulfonic acids, salts or organic bases with strong acids, such as pyridine hydrochloride or pyridine tosylate as well as Lewis acids. Preferred acid catalyst is p-toluene sulfonic acid.

The mixture is maintained at a temperature below 60° C. for a period from about 30 minutes to about 4 hours, preferably under stirring; generally after an hour at room temperature the reaction can be considered to be over. At the end of the reaction by neutralizing the mixture with a few drops of a base, particularly pyridine, there is obtained an ether of a 1α,3,3-trihydroxy-5α-steroid having at the ring A the structure II, which can be isolated according to conventional methods, for example by evaporation of the solvent and recrystallization of the residue or by direct precipitation with water. Sometimes the precipitation may be favoured by letting the mixture to stand in an ice-box for a short time.

By subjecting the intermediate tri-ether thus obtained to hydrolysis under mild acidic conditions, for example by treatment with dilute oxalic acid at room temperature for a short time, there is obtained with excellent yield a corresponding ether of a 1α - hydroxy - 3 - keto - 5α-steroid having at the ring A the structure III above.

The process of this invention for the preparation of ethers of 1α - hydroxy - 3 - keto - 5α - steroids may be also carried out without isolating the intermediate tri-ether of Formula II. For this purpose the reaction mixture, resulting from the treatment of the Δ¹ - 3 - keto-5α - steroid with the orthoformate and alcohol as said above and containing the tri-ether of Formula II, is directly worked under aqueous acidic conditions, for example by adding thereto a few drops of water or of a dilute acid. The ethers of the 1α - hydroxy - 3 - keto-5α - steroids III are so obtained by a one-step procedure.

In carrying out the process of the present invention it is necessary to bear in mind that both the alcohol and the orthoformate participate in the reaction. Therefore they should have the same hydrocarbon radical in order to obtain a single reaction product.

It may occur, however, that particular orthoformates are not promptly available, for example when typical alcohols such as butyl or pentyl alcohols are involved in the reaction. In this case one can employ as reaction components the easily available ethyl orthoformate together with the desired alcohol. In the course of the process a main product forms consisting of a triether of a 1α,3,3 - trihydroxy - 5α - steroid (or a corresponding ether of a 1α - hydroxy - 3 - keto - 5α - steroid according to the working conditions) in which the ether radical is that of the alcohol employed and a by-product consisting of the corresponding 1α,3,3 - tri - ethoxy - 5α - steroid (or 1α - ethoxy - 3 - keto - 5α - steroid). The two products so obtained can be separated from each other for example by fractional crystallization or by chromatography. The amount of the two products depends on the nature and the proportions of the reacting ethyl orthoformate and alcohol; however only one product can be practically obtained if the chosen alcohol is employed in excess over the ethyl orthoformate.

It will be up to those skilled in the art to select everytime the more suitable reaction conditions to obtain the best yield of the final product; it is however necessary to point out that methanol and methyl orthoformate are highly reactive, so that it is advisable to limit their use to the preparation of the 1α - methoxy derivatives.

The process of this invention is quite general and may be applied to any Δ¹ - 3 - keto - 5α - steroid of the androstane, pregnane, cholestane and sapogenine series. Possible substituents present in the cyclopentanepolyhydrophenanthrene nucleus, such as free, etherified or esterified hydroxy groups, sterically hindered keto groups, halogens, methyl or methylene groups in one or more of the 6, 7, 8, 9, 11, 12 or 16 positions do not interfere with the formation of the ethers of the 1α-hydroxy - 3 - keto - 5α - steroids. Other possible double bonds present at rings C and D do not affect in any way the process of the invention. If some sterically unhindered keto groups are present in the molecule of the starting compound, they react in the first step of the process to give the corresponding ketal. However if the reaction mixture is then worked under aqueous acidic conditions the starting keto groups are quantitatively restored.

Preferred tri - ethers of 1α,3,3 - trihydroxy - 5α-steroids obtained as intermediates according to the process of this invention, are those of the androstane and pregnane series represented by the following formulas:

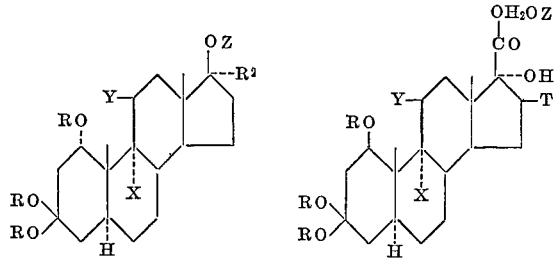

wherein R is a lower hydrocarbon radical as hereinabove defined, Y represents hydrogen, a ketonic oxygen or a β - hydroxy group, X represents hydrogen or fluorine, T is α-CH₃, β-CH₃ or α-OZ, Z represents hydrogen or an acyl group derived from a carboxylic acid containing up to 9 carbon atoms and R² is hydrogen or lower alkyl and in which X is fluorine only when Y is β-hydroxy.

The acyl groups derived from carboxylic acids containing up to 9 carbon atoms include saturated and unsaturated aliphatic acyl, benzoyl, substituted benzoyl, arylaliphatic acyl, cycloaliphatic acyl and cycloalkyl aliphatic acyl. Representative esters are the acetate, propionate, trimethylacetate, butyrate, isobutyrate, valerate, caproate, oenanthate, benzoate, phenylpropionate, cyclopentylpropionate and cyclohexylacetate.

These compounds are particularly useful, because they can be easily pyrolyzed to corresponding enol ethers of the corresponding Δ¹ - 3 - keto - 5α - steroids disclosed and claimed in our copending application Ser. No. 640,419, filed May 22,1967.

The following examples illustrate the invention.

EXAMPLE 1

A mixture of 7.68 g. of 17β-acetoxy-Δ¹-5α-androsten-3-one, 15 cc. of absolute methanol, 5 cc. of methyl orthoformate and 70 mg. of p-toluenesulfonic acid is maintained under stirring at room temperature for about an hour and after addition of few drops of pyridine is kept in ice-box for a further hour. The crystalline precipitate is filtered and 4.12 g. of 1α,3,3-trimethoxy-17β-acetoxy-5α-androstane are obtained. M.P. 101–103– C. (dec.); $[\alpha]_D^{22} = +30°$ (dioxane, c.=0.5%). The mother water maintained in ice-box for a further hour, give other 1.77 g. of 1α,3,3-trimethoxy-17β-acetoxy-5α - androstane M.P. 102° C.

500 mg. of this product in 25 cc. of methanol are treated with 500 mg. of oxalic acid dissolved in 5 cc. of water. The mixture is let to stand at room temperature for an hour, then is neutralized with sodium bicarbonate and precipitated with water. The precipitate is filtered and crystallized from methanol to give the 1α-methoxy-17β-acetoxy-5α-androstan-3-one; M.P. 195–197° C., $$[\alpha]_D^{22} = +43°$$

(dioxane, c.=0.5%).

EXAMPLE 2

A mixture of 5 g. of 17β-acetoxy-Δ¹-5α-androsten-3-one, 6 cc. of ethyl orthoformate, 15 cc. of absolute ethanol and 125 g. of p-toluenesulfonic acid is maintained under stirring at room temperature for an hour, then is treated with a few drops of pyridine and concentrated under vacuum. The residue, taken up with methanol, gives the 1α,3,3-triethoxy-17β-acetoxy-5α-androstane:, M.P. 65–70° C., $[\alpha]_D^{22} = +45.5°$ (dioxane, c.=0.5%).

By hydrolyzing this product as in Example 1, 1α-ethoxy-17β-acetoxy-5α-androstan-3-one is obtained.

EXAMPLE 3

A mixture of 1 g. of 17β-acetoxy-Δ¹-5α-androsten-3-one, 0.7 g. of ethyl orthoformate, 2 cc. of allyl alcohol and 10 mg. of p-toluenesulfonic acid is stirred at room temperature for about an hour then is treated with a few drops of pyridine and concentrated under vacuum. The residue, taken up with methanol gives the 1α,3,3-triallyloxy-17β-acetoxy-5α-androstane.

I.R. spectrum maxima: 1740, 1650, 1250, 1185, 1175, 1115, 1092, 1030, 920, 850 and 735 cm.⁻¹.

By hydrolyzing this product as in Example 1. 1α-allyloxy-17β-acetoxy-5α-androstan-3-one is obtained.

EXAMPLE 4

A mixture of 1 g. of 17β-acetoxy-Δ¹-5α-androsten-3-one, 0.5 cc. of ethyl orthoformate, 1 cc. of propargyl alcohol and 10 mg. of p-toluenesulfonic acid is treated as described in Example 3 to give the 1α,3,3-tripropargyloxy-17β-acetoxy-5α-androstane.

I.R. spectrum maxima: 3250, 2120, 1730, 1250, 1180, 1050, 1025, 925, 840 and 755 cm.⁻¹.

By hydrolyzing this product as in Example 1. 1α-propargyloxy-17β-acetoxy-5α-androstan-3-one is obtained.

EXAMPLE 5

A solution of 1 g. of 17β-acetoxy-Δ¹-5α-androsten-3-one, 0.7 g. of ethyl orthoformate, 2 cc. of cyclopentanol and 10 mg. of pyridine tosylate in 30 cc. of anhydrous tetrahydrofurane is maintained under stirring at room temperature for about an hour, then is treated as described in Example 3, to give the 1α,3,3-tricyclopentyloxy-17β-acetoxy-5a-androstane.

I.R. spectrum maxima: 1735, 1250, 1190, 1150, 1085, 1050, 1025, 925, 840 and 755 cm.⁻¹.

By hydrolysing this product as in Example 1, 1α-cyclopentyloxy-17β-acetoxy-5α-androstan - 3 - one is obtained.

In the Table I there are reported other examples of preparation of tri-ethers of 1α,3,3-trihydroxy-5α-steroids and of the corresponding ethers of 1α-hydroxy-3-keto-5α-steroids obtainable according to the procedure set forth in the Examplies 1–5.

EXAMPLE 22

5 g. of 16β-methyl-Δ¹-5α-pregnen-11β,17α,21-triol-3,20-dione, obtained by hydrolyzing the corresponding 17,20; 20,21-bismethylenedioxy derivative, prepared according to U.S. Patent 3,138,619, are mixed with 25 cc. of anhydrous tetrahydrofuran, 6 cc. of methyl orthoformate, 15 cc. of absolute methanol and 125 mg. of pyridine tosylate. The mixture is stirred at room temperature for about 90 minutes, then neutralized by little pyridine and concentrated under vacuum. The crystalline residue which separates is taken up with methanol, to give 1α,3,3-trimethoxy-16β-methyl-5α-pregnane-11β,17α,

TABLE I

| Example | Starting material | Tri-ether of the 1α,3,3-trihydroxy-5α-steroid | Ether of the 1α-hydroxy-3-keto-5α-steroid |
|---|---|---|---|
| 6 | 17β-propionoxy-Δ¹-5α-androsten-3-one | 1α,3,3-trimethyoxy-17β-propionoxy-5α-androstane. | 1α-methoxy-17β-propionoxy-5α-androstan-3-one. |
| 7 | 17β-cyclohexyl-acetoxy-Δ¹-5α-androsten-3-3-one. | 1α,3,3-trimethoxy-17β-cyclohexyl-acetoxy-5α-androstane. | 1α-methoxy-17β-cyclohexylacetoxy-5α-androstan-3-one. |
| 8 | 17β-trimethylacetoxy-Δ¹-5α-androsten-3-3-one. | 1α,3,3-trimethoxy-17β-trimethylacetoxy-5α-androstane. | 1α-methoxy-17β-trimethylacetoxy-5α-androstan-3-one. |
| 9 | 17β-(β-phenyl)-propionoxy-Δ¹-5α-androsten-3-one. | 1α,3,3-trimethyoxy-17β-(β-phenyl)-propionoxy-5α-androstane. | 1α-methoxy-17β-(β-phenyl)-propionoxy-5α-androstane-3-one. |
| 10 | 17β-butyroxy-Δ¹-5α-androsten-3-one. | 1α-3,3-trimethoxy-17β-butyroxy-5α-androstane. | 1α-methoxy-17β-butyroxy-5α-androstan-3-one. |
| 11 | 17β-valeroxy-Δ¹-5α-androsten-3-one. | 1α-3,3-trimethoxy-17β-valeroxy-5α-androstane. | 1α-methoxy-17β-valeroxy-5α-androstan-3-one. |
| 12 | 17β-caproyloxy-Δ¹-5α-androsten-3-one. | 1α,3,3-trimethoxy-17β-caproyloxy-5α-androstane. | 1α-methoxy-17β-caproyloxy-5α-androstan-3-one. |
| 13 | 17β-benzoyloxy-Δ¹-5α-androsten-3-one. | 1α,3,3-trimethoxy-17β-benzoyloxy-5α-androstane. | 1α-methoxy-17β-benzoyloxy-5α-androstan-3-one. |
| 14 | 17β-(β-cyclopentyl)propionoxy-Δ¹-5α-androsten-3-one. | 1α,3,3-trimethoxy-17β-(β-cyclopentyl)-propionoxy-5α-androstane. | 1α-methoxy-17β-(β-cyclopentyl)propionoxy-5α-androstan-3-one. |
| 15 | 17α-methyl-Δ¹-5α-androsten-17β-ol-3-one. | 1α,3,3-trimethoxy-17α-methyl-5α-androstan-17β-ol. | 1α-methoxy-17α-methyl-5α-androstan-17β-ol-3-one. |
| 16 | 17β-acetoxy-Δ¹-5α-androsten-11β-ol-3-one. | 1α,3,3-trimethoxy-17β-acetoxy-5α-androstan-11β-ol. | 1α-methoxy-17β-acetoxy-5α-androstan-11β-ol-3-one. |
| 17 | 9α-fluoro-17β-acetoxy-Δ¹-5α-androsten-11β-ol-3-one. | 1α,3,3-trimethoxy-9α-fluoro-17β-acetoxy-5α-androstan-11β-ol-3-one. | 1α-mehoxy-9α-fluoro-17β-acetoxy-5α-androstan-11β-ol-3-one. |
| 18 | 9α-fluoro-17α-methyl-Δ¹-5α-androsten-11β,17α-diol-3-one. | 1α,3,3-trimethoxy-9α-fluoro-17α-methyl-5α-androstan-11β-17β-diol. | 1α-methoxy-9α-fluoro-17α-methyl-5α-androstane-11β,17β-diol-3-one. |
| 19 | 17α-ethyl-Δ¹-5α-androsten-17β-ol-3-one. | 1α,3,3-trimethoxy-17α-ethyl-5α-androstan-17β-ol. | 1α-methoxy-17α-ethyl-5α-androstan-17β-ol-3-one. |

EXAMPLE 20

A mixture of 5 g. of 17α-acetoxy-Δ¹-5α-pregnen-3,20-dione, 25 cc. of anhydrous tetrahydro-furane, 6 cc. of methyl orthoformate, 15 cc. of absolute methanol and 125 g. of pyridine tosylate is stirred at room temperature for about 90 minutes. The mixture is neutralized by little pyridine and concentrated under vacuum until dryness. The crystalline residue which separates is taken up with methanol, filtered and crystallized from methanol-methylene chloride. The 1α,3,3-trimethoxy-17α-acetoxy-5α-pregnan-20-one is so obtained, M.P. 180–182° C., $[\alpha]_D^{22} = -11.5°$ (dioxane, c.=0.5%).

By hydrolyzing this product as in Example 1, 1α-methoxy-17α-acetoxy-5α-pregnane-3,20-dione is obtained; M.P. 231–234° C., $[\alpha]_D^{22} = +28°$ (dioxane, c.=0.5%).

EXAMPLE 21

A mixture of 5 g. of 21-acetoxy-Δ¹-5α-pregnen-17α-ol-3,11,20-trione, 6 cc. of methyl orthoformate, 15 cc. of absolute methanol and 125 mg. of p-toluenesulfonic acid is treated as in Example 20 to obtain the 1α,3,3-trimethoxy-21-acetoxy - 5α - pregnan-17α-ol-11,20-dione; M.P. 201° C. (dec.); $[\alpha]_D^{22} = +118°$ (dioxane, c=0.5%).

500 mg. of the product so obtained dissolved in 25 cc. of methanol are treated with 500 mg. of oxalic acid in 5 cc. of water. The mixture is let to stand at room temperature for an hour then neutralized with sodium bicarbonate and precipitated with water. The precipitate is filtered and crystallized from methanol to give 370 mg. of 1α-methoxy-21-acetoxy-5α-pregnan-17α-ol-3,11,20-trione, M.P. 224–225° C.; $[\alpha]_D^{22} = +125°$ (dioxane. c.=0.5%).

21-triol-20-one. By hydrolyzing this product as in Example 21, 1α-methoxy-16β-methyl-5α-pregnane-11β,17α,21-triol-3,20-dione is obtained.

EXAMPLE 23

By operating as in Example 22, starting from 16α-methyl-Δ¹-5α-pregnen-11β,17α,21 - triol - 3,20-dione, obtained by hydrolyzing the corresponding 17,20; 20,21-bismethylenedioxy derivative prepared according to U.S. Patent 3,138,619, the 1α,3,3-trimethoxy-16α-methyl-5α-pregnane-11β,17α,21-triol-20-one is obtained and hydrolyzed according to Example 21 to give 1α-methoxy-16α-methyl-5α-pregnane-11β,17α,21-triol-3,20-dione.

EXAMPLE 24

By operating as in Example 20, starting from 9α-fluoro-Δ¹-5α-pregnene-11β,16α,17α,21-tetrol-3,20-dione, prepared according to U.S. Patent 3,120,517, the 1α,3,3-trimethoxy-9α-fluoro-5α-pregnane-11β,16α,17α,21-tetrol-20-one is obtained and hydrolyzed to 1α-methoxy-9α-fluoro-5α-pregnane-11β,16α,17α,21-tetrol-3,20-dione.

EXAMPLE 25

By operating as in Example 20, starting from 9α,11β-dichloro-17α-acetoxy-Δ¹-5α-pregnene-3,20-dione, prepared according to U.S. Patent 3,127,425, the 1α,3,3-trimethoxy-9α,11β-dichloro - 17α - acetoxy-5α-pregnan-20-one is obtained and hydrolyzed to 1α-methoxy-9α,11β-dichloro-17α-acetoxy-5α-pregnane-3,20-dione.

In the Table II there are reported other examples of preparation of tri-ethers of 1α,3,3-trihydroxy-5α-steroids and of the corresponding ethers of 1α-hydroxy-3-keto-5α-steroids obtainable according to the procedure set forth in the Examples 20–25.

TABLE II

| Example No. | Starting material | Tri-ether of the 1α,3,3-tri-hydroxy-5α-steroid | Ether of the 1α-hydroxy-3-keto-5α-steroid |
| --- | --- | --- | --- |
| 26 | 16β-methyl-21-valeroxy-Δ¹-5α-pregne-11β,17α-diol-3,20-dione. | 1α,3,3-trimethoxy-16β-methyl-21-valeroxy-5α-pregnane-11β,17α-diol-20-one. | 1α-methoxy-16β-methyl-21-valeroxy-5α-pregnane-11β,17α-diol-3,20-dione. |
| 27 | 16β-methyl-21-(β-phenyl)-propionoxy-Δ¹-5α-pregnene-11β,17α-diol-3,20-dione. | 1α,3,3-trimethoxy-16β-methyl-21-(β-phenyl)-propionoxy-5α-pregnane-11β,17α-diol-20-one. | 1α-methoxy-16β-methyl-21-(β-phenyl)propionoxy-5α-pregnane-11β,17α-diol-3,20-dione. |
| 28 | 16α-methyl-21-(β-cyclopentyl)propionoxy-Δ¹-5α-pregnene-11β,17α-diol-3,20-dione. | 1α,3,3-trimethoxy-16α-methyl-21-(β-cyclopentyl)propionoxy-5α-pregnane-11β,17α-diol-20-one. | 1α-methoxy-16α-methyl-21-(β-cyclopentyl)-propionoxy-5α-pregnane-11β,17α-diol-3,20-dione. |
| 29 | 9α-fluoro-16α,21-dipropionoxy-Δ¹-5α-pregnene-11β,17α-diol-3,20-dione. | 1α,3,3-trimethoxy-9α-fluoro-16α,21-dipropionoxy-5α-pregnane-11β,17α-diol-20-one. | 1α-methoxy-16α,21-dipropionoxy-9α-fluoro-5α-pregnane-11β,17α-diol-3,20-dione. |
| 30 | 9α-fluoro-16α,21-dibutyroxy-Δ¹-5α-pregnene-11β,17α-diol-3,20-dione. | 1α,3,3-trimethoxy-9α-fluoro-16α,21-dibutyroxy-5α-pregnane-11β,17α-diol-20-one. | 1α-methoxy-9α-fluoro-16α,21-dibutyroxy-5α-pregnane-11β,17α-diol-3,20-dione. |

EXAMPLE 31

A mixture of 5 g. of Δ¹-5α-androstene-3,17-dione, 6 cc. of methyl orthoformate, 15 cc. of absolute methanol and 125 mg. of p-toluenesulfonic acid is stirred at room temperature for an hour, then treated with a few drops of pyridine. The solvent is evaporated under vacuum and the residue crystallized from methanol to obtain the 1α,3,3,17,17-pentamethoxy-5α-androstane, M.P. 162–165° C.; $[\alpha]_D^{22} = +46, 5°$ (dioxane, c.=0.5%). The product thus obtained is dissolved in little methanol and treated with a few drops of dilute hydrochloric acid. After 10 minutes at room temperature the solution is neutralized with sodium bicarbonate and precipitated with water. The precipitate is filtered and crystallized from methanol to give 1α-methoxy-5α-androstane-3,17-dione, M.P. 177–179° C., $[\alpha]_D^{22} = +125°$ (dioxane, c.=0.5%).

EXAMPLE 32

To a suspension of 1 g. of 17β-acetoxy-Δ¹-5α-androsten-3-one in 2 cc. of methanol and 0.75 cc. of methyl orthoformate there are added 7 mg. of p-toluene-sulfonic acid and the resulting solution is left to stand at room temperature for 30 minutes. Upon addition under stirring of few drops of water a crystallin precipitate separates giving 0.84 g. of 1α-methoxy-17β-acetoxy-5α-androstan-3-one; M.P. 195–197° C., $[\alpha]_D^{22} = +43°$ (dioxane, c.=0.5%).

The same product is obtained by employing ethyl orthoformate in lieu of methyl orthoformate.

In an analogous manner 1α-methoxy-5α-androstan-17β-ol-3-one is obtained; M.P. 204–207° C.; $[\alpha]_D^{22} = +48°$ (dioxane, c.=0.5%).

EXAMPLE 33

By operating as in Example 32, by treating the 17β-acetoxy-Δ¹-5α-androsten-3-one with ethyl orthoformate and ethanol in the presence of p-toluene-sulfonic acid, the 1α-ethoxy-17β-acetoxy-5α-androstan-3-one is obtained; M.P. 167–169° C.; $[\alpha]_D^{22} = +41.5°$ (dioxane, c.=0.5%). Yield in crystalline product: 40%.

EXAMPLE 34

A mixture of 1 g. of 17β-acetoxy-Δ¹-5α-androsten-3-one, 0.7 cc. of ethyl orthoformate, 2 cc. of allyl alcohol and 10 mg. of p-toluenesulfonic acid is stirred at room temperature, for an hour then treated with a few drops of water. The 1α-allyloxy-17β-acetoxy-5α-androstan-3-one is so obtained; M.P. 134–137° C.; $[\alpha]_D^{22} = +48°$ (dioxane, c=0.5%).

In an analogous manner the 1α-propargyloxy-17β-acetoxy-5α-androstan-3-one is obtained; M.P. 187–190° C.; $[\alpha]_D^{22} = +42°$ (dioxane, c.=0.5%).

EXAMPLE 35

A mixture of 5 g. of 17β-acetoxy-Δ¹-5α-androsten-2-one, 6 cc. of methyl orthoformate, 10 cc. of ethanol and 125 mg. of p-toluenesulfonic acid is stirred at room temperature for an hour. After addition of some drops of water the obtained precipitate is filtered and crystallized from ether-petroleum ether to give 1α-methoxy-17β-acetoxy-5α-androstan-3-one, identical to the product of Example 32.

The mother water is concentrated under vacuum and the residue, by fractional crystallization from methanol, gives 1α-ethoxy-17β-acetoxy-5α-androstan-3-one identical to the product of Example 33.

EXAMPLE 36

A mixture of 1 g. of Δ¹-5α-androsten-17β-ol-3-one, 0.75 cc. of ethyl orthoformate, 2 cc. of ethanol and 7 mg. of p-toluenesulfonic acid is maintained under stirring for an hour at room temperature. After addition of some drops of water, there is obtained in about 50% yield the 1α-ethoxy-5α-androstan-17β-ol-3-one, melting at 142–144° C.; $[\alpha]_D^{22} = +42.5°$ (dioxane, c.=0.5%).

I.R. spectrum maxima at 3600, 1707, 1165, 1105, 1060 and 875 cm.⁻¹.

We claim:

1. In a process for the preparation of ethers of 1α-hydroxy-3-keto-5α-steroids, the step which comprises reacting a Δ¹-3-keto-5α-steroid having at the ring A the structure:

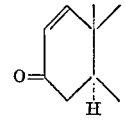

with an alcohol of formula ROH, in which R is a lower hydrocarbon radical and an orthoformate of formula H—C(OR)₃, in which R is as hereinabove defined under anhydrous conditions at a temperature below 60° C. in the presence of an acid catalyst to obtain a tri-ether of a 1α,3,3-trihydroxy-5α-steroid having at the ring A the structure:

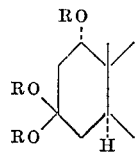

in which R is as hereinbefore defined.

2. A process as claimed in claim 1, in which the alcohol is methanol and the orthoformate is methyl orthoformate.

3. A process as claimed in claim 1, in which the reaction is carried out at about room temperature.

4. A process as claimed in claim 1 in which the acid catalyst is p-toluenesulfonic acid.

5. A process as claimed in claim 1, in which the resulting tri-ether of the 1α,3,3-trihydroxy-5α-steroid is hydrolyzed under mild acidic conditions to obtain an ether of a 1α-hydroxy-3-keto-5α-steroid having at the ring A the structure:

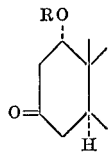

in which R is a lower hydrocarbon radical.

6. A process as claimed in claim 5 in which the hydrolysis is carried out at about room temperature in the presence of oxalic acid.

7. A process for the preparation of ethers of 1α-hydroxy-3-keto-5α-steroids having at the ring A the structure:

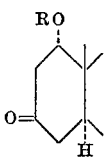

in which R is a lower hydrocarbon radical, which comprises reacting a Δ¹-3-keto-5α-steroid having at the ring A the structure:

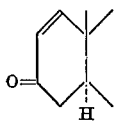

with an alcohol of formula ROH and an orthoformate of formula H—C(OR)₃, in which R is as hereinabove defined, under anhydrous conditions at a temperature below 60° C. in the presence of an acid catalyst and thereafter working the reaction mixture under aqieous acidic conditions.

8. A compound of formula:

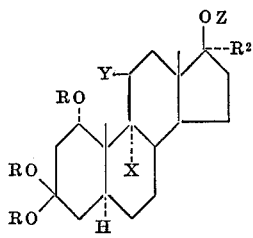

in which R is a lower hydrocarbon radical, Y is selected from the group consisting of hydrogen, a ketonic oxygen and a β-hydroxy group, X is selected from the group consisting of hydrogen and fluorine, Z is selected from the group consisting of hydrogen and an acyl group derived from a carboxylic acid containing up to 9 carbon atoms and R² is selected from the group consisting of hydrogen and lower alkyl, provided that X is fluorine only when Y is β-hydroxy.

9. 1α,3,3-trimethoxy-17β-acetoxy-5α-androstane.
10. 1α,3,3-triethoxy-17β-acetoxy-5α-androstane.
11. A compound of formula:

in which R is a lower hydrocarbon radical, Y is selected from the group consisting of hydrogen, a ketonic oxygen and a β-hydroxy group, X is selected from the group consisting of hydrogen and fluorine, T is selected from the group consisting of hydrogen, α-CH₃, β-CH₃ and α-OZ and Z is selected from the group consisting of hydrogen and an acyl group derived from a carboxylic acid containing up to 9 carbon atoms, provided that X is fluorine only when Y is β-hydroxy.

12. 1α,3,3 - trimethoxy - 21 - acetoxy - 5α - pregnan-17α-ol-11,20-dione.
13. 1α,3,3 - trimethoxy - 16β - methyl - 5α - pregnane-11β,17α,21-triol-20-one.
14. 1α,3,3 - trimethoxy - 16α - methyl - 5α - pregnane-11β,17α,21-triol-20-one.
15. 1α,3,3 - trimethoxy - 9α - fluoro - 5α - pregnane-11β,16α,17α,21-tetrol-20-one.
16. 1α,3,3 - trimethoxy - 9α - fluoro - 16α,21-diacetoxy-5α-pregnane-11β,17α-diol-20-one.
17. 1α,3,3 - trimethoxy - 17α - acetoxy - 5α - pregnan-20-one.

References Cited

UNITED STATES PATENTS 2,904,564   9/1959   Tristram.

ELBERT L. ROBERTS, Primary Examiner

U.S. Cl. X.R.
260—397.4, 397.5

UNITED STATES PATENT OFFICE
CERTIFICATE OF CORRECTION

Patent No. 3,475,467                                     October 28, 1969

Rinaldo Gardi et al.

It is certified that error appears in the above identified patent and that said Letters Patent are hereby corrected as shown below:

Column 1, line 63, "lowe" should read -- low --. Column 2, line 21, "alyl" should read -- allyl --; line 37, "or" should read -- of --. Column 3, lines 50 to 60, in the formula on the right, the "$OH_2OZ$" group in the 21-position should read -- $CH_2OZ$ --. Column 4, line 66, the I.R. spectrum values "1050, 1025, 925, 840 and 755 cm.$^{-1}$" should read -- 1150, 1110, 1095, 925 and 845 cm.$^{-1}$ --, respectively. Column 5, line 4, the I.R. spectrum value "1050" should read -- 1040 --; line 12, "Examplies" should read -- Examples --. Columns 5 and 6, TABLE I, tri-ether corresponding to Example 6, "1α,3,3-trimethyoxy" should read -- 1α,3,3-trimethoxy --; same table, first column, the starting material of Example 7, "androsten-3-3-one" should read -- androsten-3-one --; same table first column, starting material of Example 11, cancel "one", second occurrence. Columns 7 and 8, TABLE II, first column, starting material of Example 26, "pregne" should read -- pregnene --. Column 7, line 67, "-2-" should read -- -3- --. Column 9, line 23, "aqieous" should read -- aqueous --.

Signed and sealed this 17th day of November 1970.

(SEAL)
Attest:

EDWARD M. FLETCHER, JR.                           WILLIAM E. SCHUYLER, JR.
Attesting Officer                                            Commissioner of Patents